(12) United States Patent
Anada

(10) Patent No.: US 8,279,921 B2
(45) Date of Patent: Oct. 2, 2012

(54) MOVING IMAGE REPRODUCING APPARATUS

(75) Inventor: Yoshitaka Anada, Osaka (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 1533 days.

(21) Appl. No.: 11/666,661

(22) PCT Filed: Sep. 26, 2005

(86) PCT No.: PCT/JP2005/018227
§ 371 (c)(1),
(2), (4) Date: May 1, 2007

(87) PCT Pub. No.: WO2006/051657
PCT Pub. Date: May 18, 2006

(65) Prior Publication Data
US 2007/0263100 A1 Nov. 15, 2007

(30) Foreign Application Priority Data
Nov. 10, 2004 (JP) .................................. 2004-325892

(51) Int. Cl.
*H04N 7/12* (2006.01)
(52) U.S. Cl. .................... 375/240.02; 348/222.1
(58) Field of Classification Search .......... 375/240.02, 375/240.03, 240.04, 240.05, 240.06, 240.07; 348/222.1
See application file for complete search history.

(56) References Cited

U.S. PATENT DOCUMENTS

| | | | |
|---|---|---|---|
| 6,044,115 A * | 3/2000 | Horiike et al. | 375/240.05 |
| 7,539,399 B1 | 5/2009 | Tsujii | |
| 7,889,974 B2 * | 2/2011 | Oka | 386/278 |
| 2008/0159723 A1 | 7/2008 | Tsujii | |

FOREIGN PATENT DOCUMENTS

| | | |
|---|---|---|
| JP | 9-130758 | 5/1997 |
| JP | 2001-92429 | 4/2001 |
| JP | 2001-094933 | 4/2001 |
| JP | 3403141 | 2/2003 |
| JP | 2004-48530 | 2/2004 |

OTHER PUBLICATIONS

English Translation of JP Publication 2001-092429 from international search report; Mamoru, Kano; Frame Rate Converter; Jun. 4, 2001; paragraphs [0004]-[0018] and Figs. 10-12.*

* cited by examiner

Primary Examiner — Gilberto Barron, Jr.
Assistant Examiner — Malcolm Cribbs
(74) Attorney, Agent, or Firm — Kratz, Quintos & Hanson, LLP

(57) ABSTRACT

A moving image reproducing apparatus (10) includes a video encoder (18). The video encoder (18) reproduces a moving image including a partial moving image having a frame rate different from a reference frame rate at the reference frame rate. A CPU (26) calculates a difference value between a first frame count required to reproduce the partial moving image in real time and a second frame count obtained by performing periodic frame interpolation processing on the partial moving image. The CPU (26) dispersively executes frame thinning-out processing on the moving image at the number of times corresponding to the calculated difference value. The CPU (26) further executes frame interpolation processing on the partial moving image at the number of times corresponding to the second frame count.

8 Claims, 9 Drawing Sheets

16ts

| Ts[K] | FRAME COUNT | SAMPLE COUNT | DIVIDED VALUE | ROUNDED-UP VALUE |
|---|---|---|---|---|
| Ts[0] | 25 | 1000 | 1 | 1 |
| Ts[1] | 5 | 2000 | 2 | 2 |
| Ts[2] | 30 | 1800 | 1.8 | 2 |

FIG. 4

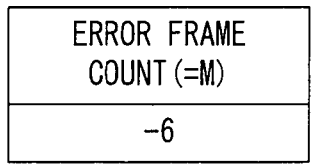

16r

| ERROR FRAME COUNT (=M) |
|---|
| −6 |

| Ta[x] | ADDRESS, SIZE | Ta[x] | ADDRESS, SIZE |
|---|---|---|---|
| Ta[0] | ad[1], sz[1] | Ta[30] | ad[31], sz[31] |
| Ta[1] | ad[2], sz[2] | Ta[31] | ad[32], sz[32] |
| Ta[2] | ad[3], sz[3] | Ta[32] | ad[33], sz[33] |
| Ta[3] | ad[4], sz[4] | Ta[33] | ad[34], sz[34] |
| Ta[4] | ad[5], sz[5] | Ta[34] | ad[35], sz[35] |
| Ta[5] | ad[6], sz[6] | Ta[35] | ad[36], sz[36] |
| Ta[6] | ad[7], sz[7] | Ta[36] | ad[37], sz[37] |
| Ta[7] | ad[8], sz[8] | Ta[37] | ad[38], sz[38] |
| Ta[8] | ad[9], sz[9] | Ta[38] | ad[39], sz[39] |
| Ta[9] | ad[10], sz[10] | Ta[39] | ad[40], sz[40] |
| Ta[10] | ad[11], sz[11] | Ta[40] | ad[41], sz[41] |
| Ta[11] | ad[12], sz[12] | Ta[41] | ad[42], sz[42] |
| Ta[12] | ad[13], sz[13] | Ta[42] | ad[43], sz[43] |
| Ta[13] | ad[14], sz[14] | Ta[43] | ad[44], sz[44] |
| Ta[14] | ad[15], sz[15] | Ta[44] | ad[45], sz[45] |
| Ta[15] | ad[16], sz[16] | Ta[45] | ad[46], sz[46] |
| Ta[16] | ad[17], sz[17] | Ta[46] | ad[47], sz[47] |
| Ta[17] | ad[18], sz[18] | Ta[47] | ad[48], sz[48] |
| Ta[18] | ad[19], sz[19] | Ta[48] | ad[49], sz[49] |
| Ta[19] | ad[20], sz[20] | Ta[49] | ad[50], sz[50] |
| Ta[20] | ad[21], sz[21] | Ta[50] | ad[51], sz[51] |
| Ta[21] | ad[22], sz[22] | Ta[51] | ad[52], sz[52] |
| Ta[22] | ad[23], sz[23] | Ta[52] | ad[53], sz[53] |
| Ta[23] | ad[24], sz[24] | Ta[53] | ad[54], sz[54] |
| Ta[24] | ad[25], sz[25] | Ta[54] | ad[55], sz[55] |
| Ta[25] | ad[26], sz[26] | Ta[55] | ad[56], sz[56] |
| Ta[26] | ad[27], sz[27] | Ta[56] | ad[57], sz[57] |
| Ta[27] | ad[28], sz[28] | Ta[57] | ad[58], sz[58] |
| Ta[28] | ad[29], sz[29] | Ta[58] | ad[59], sz[59] |
| Ta[29] | ad[30], sz[30] | Ta[59] | ad[60], sz[60] |

| Tb[y] | ADDRESS, SIZE | Tb[y] | ADDRESS, SIZE | Tb[y] | ADDRESS, SIZE |
|---|---|---|---|---|---|
| Tb[0] | ad[2], sz[2] | Tb[30] | ad[30], sz[30] | Tb[60] | SKIP FRAME |
| Tb[1] | ad[3], sz[3] | Tb[31] | SKIP FRAME | Tb[61] | ad[46], sz[46] |
| Tb[2] | ad[4], sz[4] | Tb[32] | ad[31], sz[31] | Tb[62] | ad[47], sz[47] |
| Tb[3] | ad[5], sz[5] | Tb[33] | SKIP FRAME | Tb[63] | SKIP FRAME |
| Tb[4] | ad[6], sz[6] | Tb[34] | ad[32], sz[32] | Tb[64] | ad[48], sz[48] |
| Tb[5] | ad[7], sz[7] | Tb[35] | SKIP FRAME | Tb[65] | SKIP FRAME |
| Tb[6] | ad[8], sz[8] | Tb[36] | ad[33], sz[33] | Tb[66] | ad[49], sz[49] |
| Tb[7] | ad[9], sz[9] | Tb[37] | SKIP FRAME | Tb[67] | SKIP FRAME |
| Tb[8] | ad[10], sz[10] | Tb[38] | ad[34], sz[34] | Tb[68] | ad[50], sz[50] |
| Tb[9] | ad[11], sz[11] | Tb[39] | SKIP FRAME | Tb[69] | SKIP FRAME |
| Tb[10] | ad[12], sz[12] | Tb[40] | ad[35], sz[35] | Tb[70] | ad[51], sz[51] |
| Tb[11] | ad[13], sz[13] | Tb[41] | SKIP FRAME | Tb[71] | SKIP FRAME |
| Tb[12] | ad[14], sz[14] | Tb[42] | ad[36], sz[36] | Tb[72] | ad[52], sz[52] |
| Tb[13] | ad[15], sz[15] | Tb[43] | SKIP FRAME | Tb[73] | SKIP FRAME |
| Tb[14] | ad[16], sz[16] | Tb[44] | ad[37], sz[37] | Tb[74] | ad[53], sz[53] |
| Tb[15] | ad[18], sz[18] | Tb[45] | ad[38], sz[38] | Tb[75] | SKIP FRAME |
| Tb[16] | ad[19], sz[19] | Tb[46] | SKIP FRAME | Tb[76] | ad[54], sz[54] |
| Tb[17] | ad[20], sz[20] | Tb[47] | ad[39], sz[39] | Tb[77] | ad[55], sz[55] |
| Tb[18] | ad[21], sz[21] | Tb[48] | SKIP FRAME | Tb[78] | SKIP FRAME |
| Tb[19] | ad[22], sz[22] | Tb[49] | ad[40], sz[40] | Tb[79] | ad[56], sz[56] |
| Tb[20] | ad[23], sz[23] | Tb[50] | SKIP FRAME | Tb[80] | SKIP FRAME |
| Tb[21] | ad[24], sz[24] | Tb[51] | ad[41], sz[41] | Tb[81] | ad[57], sz[57] |
| Tb[22] | ad[25], sz[25] | Tb[52] | SKIP FRAME | Tb[82] | SKIP FRAME |
| Tb[23] | ad[26], sz[26] | Tb[53] | ad[42], sz[42] | Tb[83] | ad[58], sz[58] |
| Tb[24] | SKIP FRAME | Tb[54] | SKIP FRAME | Tb[84] | SKIP FRAME |
| Tb[25] | ad[27], sz[27] | Tb[55] | ad[43], sz[43] | Tb[85] | ad[59], sz[59] |
| Tb[26] | SKIP FRAME | Tb[56] | SKIP FRAME | Tb[86] | SKIP FRAME |
| Tb[27] | ad[28], sz[28] | Tb[57] | ad[44], sz[44] | Tb[87] | ad[60], sz[60] |
| Tb[28] | SKIP FRAME | Tb[58] | SKIP FRAME | Tb[88] | SKIP FRAME |
| Tb[29] | ad[29], sz[29] | Tb[59] | ad[45], sz[45] | | |

# MOVING IMAGE REPRODUCING APPARATUS

TECHNICAL FIELD

The present invention relates to a moving image reproducing apparatus. More specifically, the present invention relates to a moving image reproducing apparatus reproducing a moving image including a partial moving image having a frame rate different from a reference frame rate at the reference frame rate.

PRIOR ART

An example of such a kind of conventional apparatus is disclosed in Patent Document 1 (Japanese Patent No. 3403141). According to this prior art, when a moving image file is reproduced, index information of each frame forming the moving image is first detected from the moving image file, and the detected index information is set to an index information table. The image data of each frame is sequentially reproduced by consulting the index information table thus created. Consequently, a moving image moving in real time (at a speed the same as that of an object in photographing, that is, at a real speed) is output from a monitor screen.

However, the prior art assumes that the frame rate (screen rate) of the image data stored in the moving image file is constant. Thus, when a frame rate locally varies in photographing, it is impossible to reproduce the moving image in real time.

SUMMARY OF THE INVENTION

Therefore, it is a primary object of the present invention to provide a novel moving image reproducing apparatus.

Another object of the present invention is to provide a moving image reproducing apparatus capable of reproducing in real time a moving image which is lack of evenness of a screen rate.

A moving image reproducing apparatus according to an invention of claim 1 comprises: a reproducing means for reproducing a moving image including a partial moving image having a screen rate different from a reference screen rate at the reference screen rate; a calculating means for calculating a difference value between a first number indicative of the number of screens required to reproduce the partial moving image in real time and a second number indicative of the number of screens obtained by performing periodic screen count adjusting processing on the partial moving image; a first adjusting means for dispersively executing the screen count adjusting processing on the moving image at number of times corresponding to the difference value calculated by the calculating means; and a second adjusting means for executing the screen count adjusting processing on the partial moving image at the number of times corresponding to the second number.

A moving image includes a partial moving image having a screen rate different from the reference screen rate. A reproducing means reproduces such a moving image at a reference screen rate. A calculating means calculates a difference value between a first number indicative of the number of screens required to reproduce the partial moving image in real time and a second number indicative of the number of screens obtained by performing periodic screen count adjusting processing on the partial moving image. A first adjusting means dispersively executes executing screen count adjusting processing on the moving image at number of times corresponding to the difference value calculated by the calculating means. Furthermore, a second adjusting means executes the screen count adjusting processing on the partial moving image at the number of times corresponding to the second number.

Through the screen count adjusting processing by the first adjusting means and the second adjusting means, the moving image is reproduced in real time. Furthermore, through screen count adjusting processing by the second adjusting means, a smooth movement of the partial moving image is realized.

A moving image reproducing apparatus according to an invention of claim 2 is dependent on claim 1, and a screen rate of the partial moving image is lower than the reference screen rate, and the screen count adjusting processing to be executed by the second adjusting means is processing for interpolating a screen. Thus, the number of screens of the partial moving image approaches the number of screens required for reproduction in real time.

A moving image recording apparatus according to an invention of claim 3 is dependent on claim 2, and the screen rate of the partial moving image is different from 1/integer of the reference screen rate.

A moving image reproducing apparatus according to an invention of claim 4 is dependent on claim 2, and the first number is larger than the second number, and the screen count adjusting processing to be executed by the first adjusting means is processing for thinning-out of the screen. Thus, the number of screens of the moving image is coincident with the number of screens required for the reproduction in real time.

A moving image reproducing apparatus according to an invention of claim 5 is dependent on claim 1, and the first adjusting means includes a determining means for determining a timing to execute the screen count adjusting processing on the basis of the number of screens to be reproduced by the reproducing means and the difference value calculated by the calculating means. Thus, the screen count adjusting processing can be performed over the entire moving image.

A moving image reproducing apparatus according to an invention of claim 6 is dependent on claim 1, and the calculating means includes a dividing means for dividing a parameter value in relation to the screen rate of the partial moving image by a parameter value in relation to the reference screen rate; a numerical value converting means for rounding the divided value obtained by the dividing means, and a difference calculating means for calculating the difference value on the basis of the divided value obtained by the dividing means and the converted value obtained by the numerical value converting means.

A moving image reproducing program according to an invention of claim 7 is a moving image reproducing program to be executed by a processor of a moving image reproducing apparatus, and comprises a reproducing step for reproducing a moving image including a partial moving image having a screen rate different from a reference screen rate at the reference screen rate; a calculating step for calculating a difference value between a first number indicative of the number of screens required to reproduce the partial moving image in real time and a second number indicative of the number of screens obtained by performing periodic screen count adjusting processing on the partial moving image; a first adjusting step for dispersively executing the screen count adjusting processing on the moving image at the number of times corresponding to the difference value calculated by the calculating step; and a second adjusting means for executing the screen count adjusting processing on the partial moving image at the number of times corresponding to the second number.

Similarly to the invention in claim 1, it is possible to realize a reproduction of the moving image in real time and make the movement of the partial moving image smooth.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing one example of a configuration of a register applied to FIG. 1 embodiment;

FIG. 5 is an illustrative view showing one example of a configuration of a frame table applied to FIG. 1 embodiment;

FIG. 6 is an illustrative view showing one example of a configuration of another frame table applied to FIG. 1 embodiment;

BEST MODE FOR PRACTICING THE INVENTION

Figure 1:
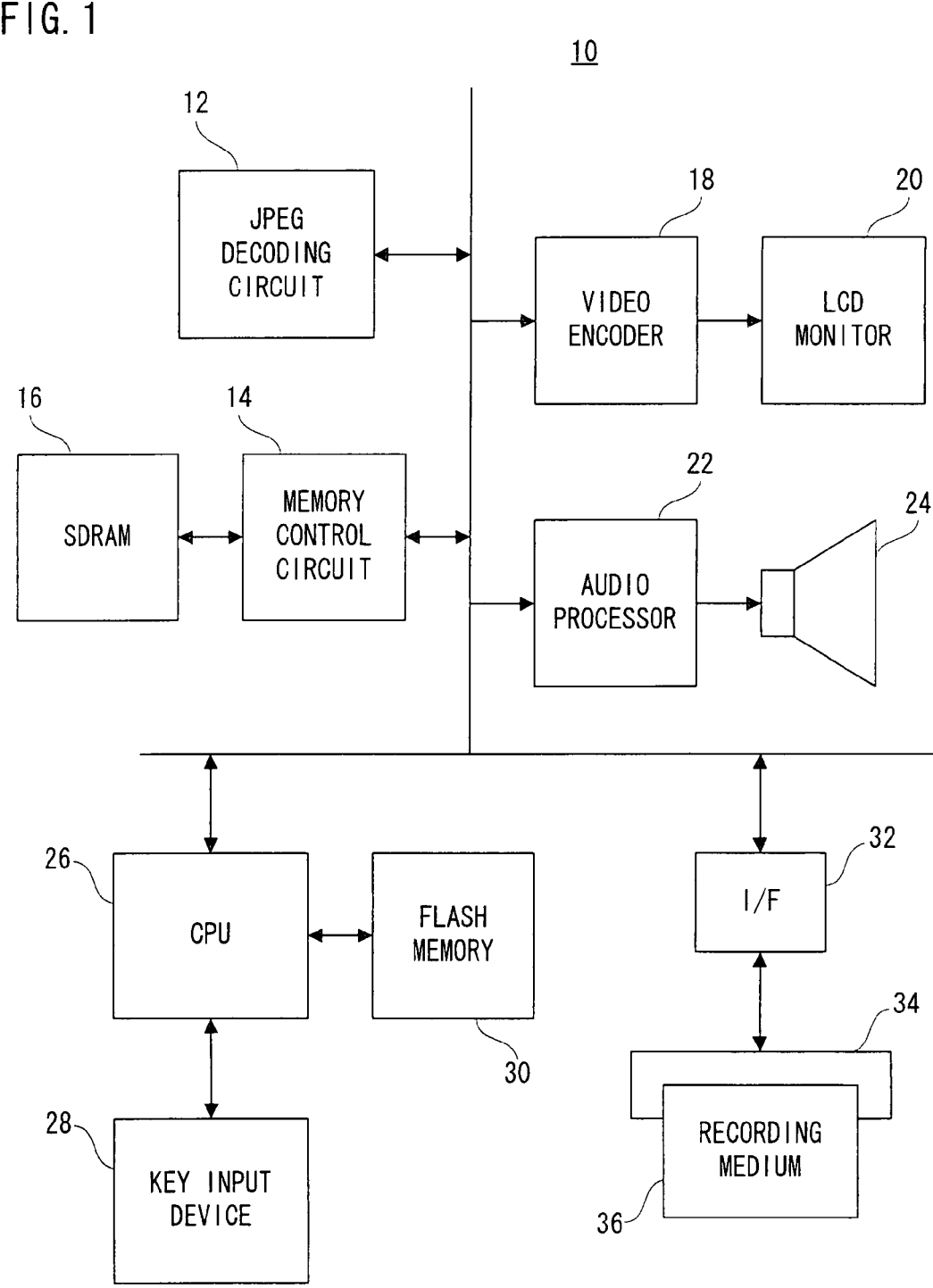
FIG. 1 is a block diagram showing a configuration of one embodiment of the present invention.

Referring to FIG. 1, a moving image reproducing apparatus 10 of this embodiment includes a slot 34 through which a recording medium 36 recording a moving image file is detachabley attached. When a reproducing operation is performed by a key input device 28, a corresponding key input signal is applied to a CPU 26. The CPU 26 performs reproduction processing on a desired moving image file recorded in the recording medium 36.

Movie data stored in the moving image file is formed by a plurality of frames of compressed image data each of which is compressed by a JPEG system and sound data encoded by a predetermined system. The compressed image data and sound data forming the movie data of the desired moving image file are written to a compressed image area and sound area (both not shown) of an SDRAM 16 through an I/F 32 and a memory control circuit 14.

A JPEG decoding circuit 12 reads compressed image data of each frame stored in the compressed image area through the memory control circuit 14, decodes the read compressed image data, and writes the decoded image data to a decoded image area (not illustrated) of the SDRAM 16 through the memory control circuit 14. A video encoder 18 reads the decoded image data of each frame from the decoded image area through the memory control circuit 14, and converts the read image data into a composite video signal in an NTSC system. The converted composite video signal is applied to an LCD monitor 20, and whereby a moving image is displayed on a monitor screen.

An audio processor 22 reads the sound data stored in the sound area of the SDRAM 16 through the memory control circuit 14, and decodes the read sound data. The decoded sound signal is output from a speaker 24.

Figures 2, 3:
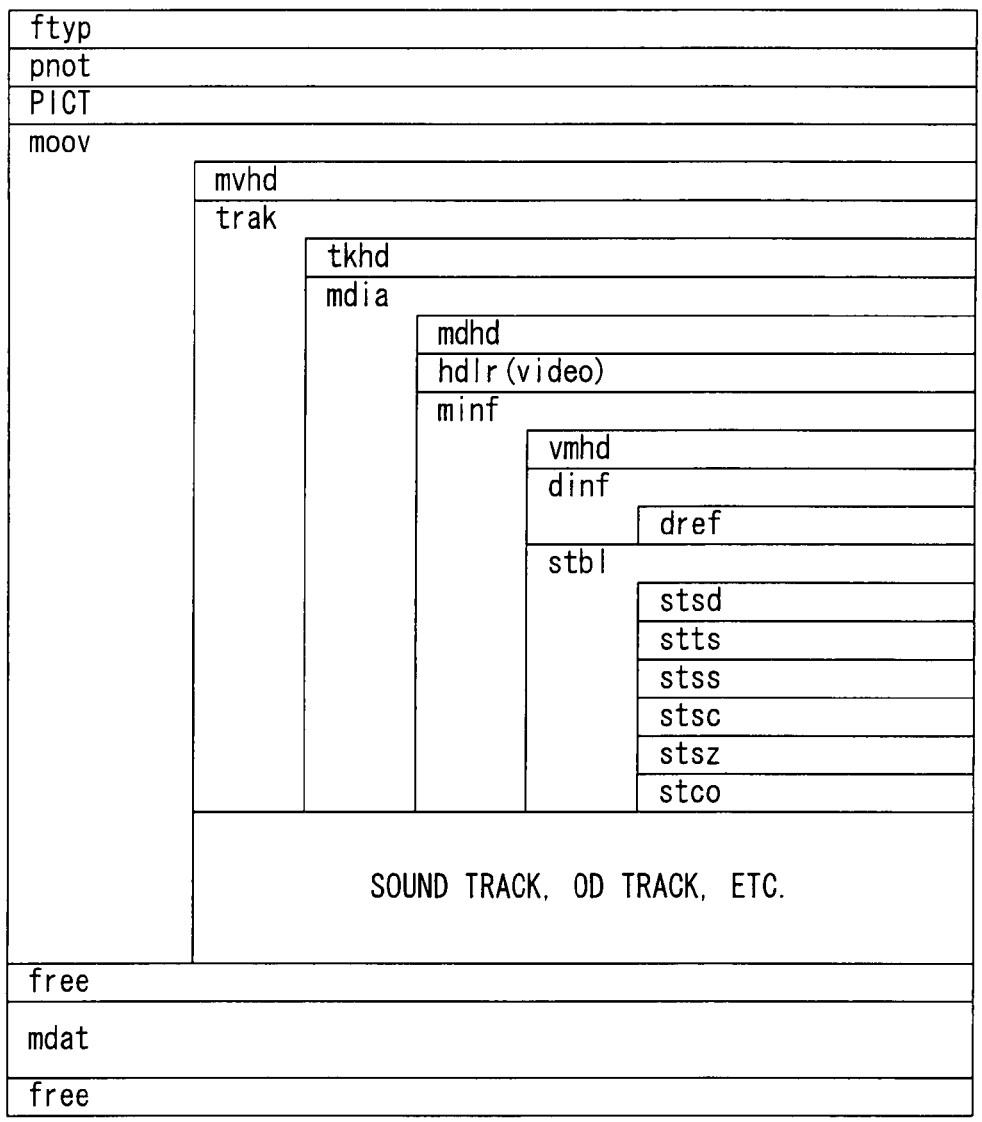
FIG. 2 is an illustrative view showing one example of data structure of the QuickTime file.
FIG. 3 is an illustrative view showing one example of a configuration of a TS table applied to FIG. 1 embodiment.
Figure 7:
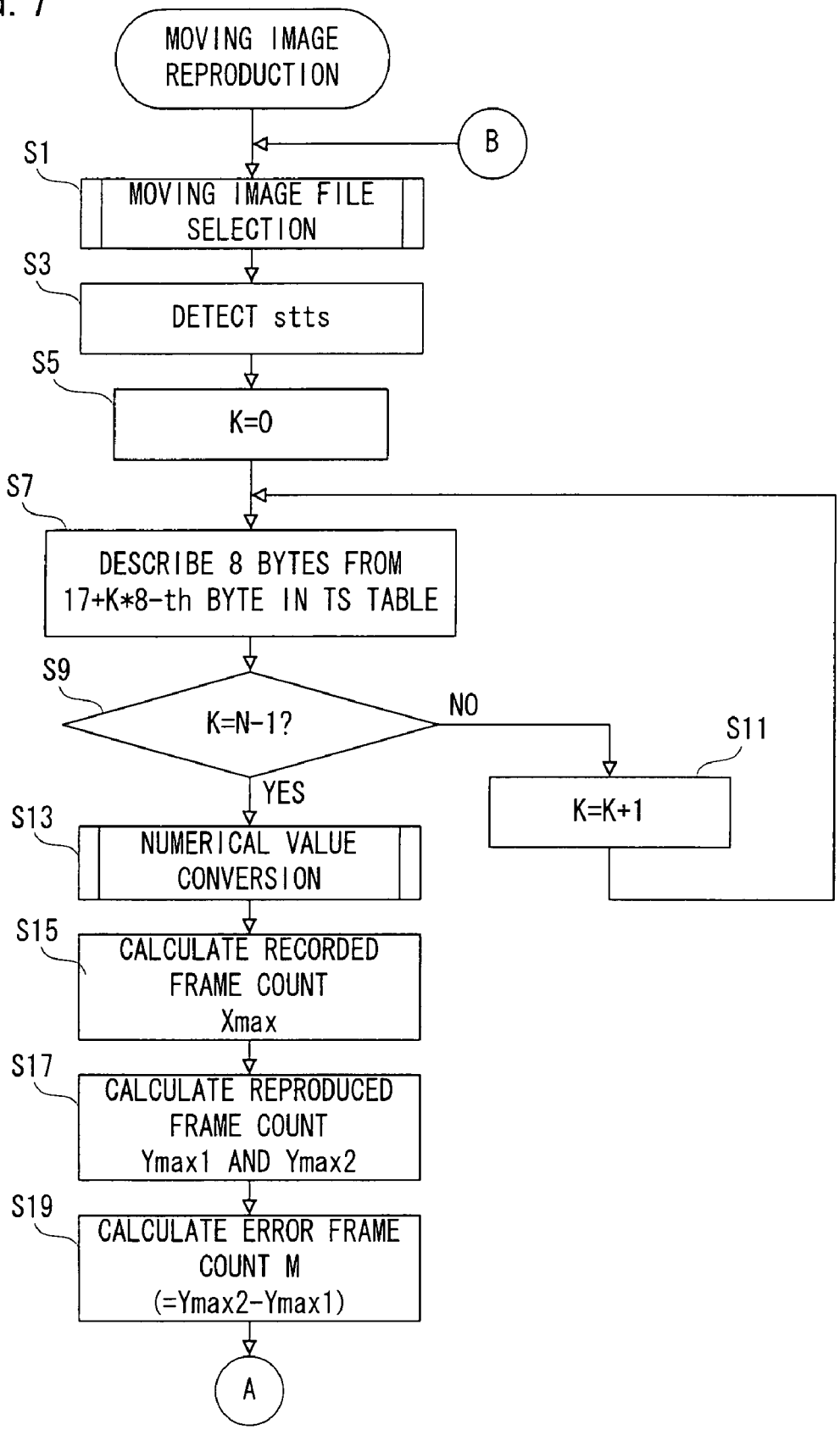
FIG. 7 is a flowchart showing a part of an operation of a CPU applied to FIG. 1 embodiment.
Figure 8:
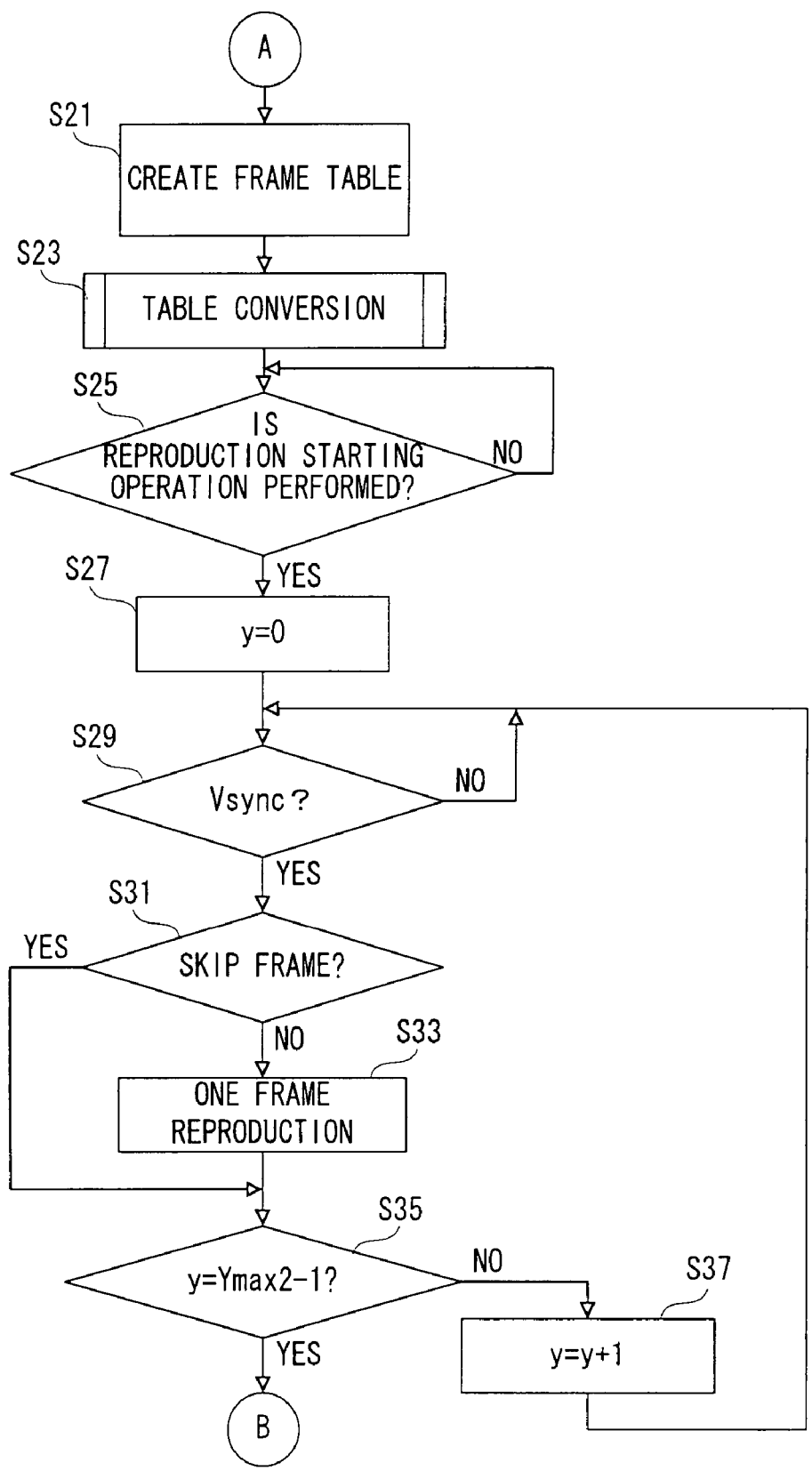
FIG. 8 is a flowchart showing another part of the operation of the CPU applied to FIG. 1 embodiment.

The data stored in the moving image file complies with a QuickTime format, and has a data structure shown in FIG. 2.

According to FIG. 2, file type information ftyp is assigned to a head, and preview data pnot and thumbnail data PICT are assigned. A movie resource moov is formed by a movie header mvhd, a video track trak, a sound track, OD (Object Description) track, etc. The movie resource moov is followed by a free area free, movie data mdat, and a free area free in this order.

The video track trak includes a table stbl. The table is formed by an stsd table, an stts table, an stss table, an stsc table, an stsz table and an stco table. The starting position of compressed image data of each frame and a timed relationship of frames are specified by these tables. The timed relationship of frames is specifically defined by the stts table.

Additionally, the data structure of the QuickTime format is well known, and therefore, more detailed description about the video track trak will be omitted.

In a case that the frame rate is uniform, the stts table is constructed as shown in the Table 1.

TABLE 1

| size (4 bytes) | 24 bytes | |
|---|---|---|
| type (4 bytes) | "stts" | |
| flags (4 bytes) | 0 | |
| NumberOfEntry (4 bytes) | 1 | |
| Time-To-Sample table[0] (4 bytes * 2) | frame count | sample count |

According to Table 1, the stts table has size information size (=4 bytes), type information type (=4 bytes), flag information flags (=4 bytes), entry count information NumberOfEntry (=4 bytes), and a table Time-To-Sample table (=4 bytes*2).

The size information size is information indicative of the size of the table, and "24 bytes" is described here. The type information type is information indicative of the type of the table, and "stts" is described here. The flag information is reservation information indicative of the extension in the future. The entry count information NumberOfEntry is information indicative of the number of tables Time-To-Sample table, and "1" is described here.

In the table Time-To-Sample table, the frame count and the sample count are described. The frame count is the number of frames of compressed image data forming the movie data mdat. The sample count is information relating to a frame rate, which is obtained by dividing a time scale described in the header mdhd of the video track trak by a reference frame rate. For example, if the reference frame rate is "30 fps", and the time scale is "30000", the sample count is "1000".

If the frame rate is not uniform, the table Time-To-Sample table is added every time that the frame rate is changed. Therefore, in a case that the number of changes of the frame rate is "N−1", the stts table is constructed as shown in Table 2.

TABLE 2

| size (4 bytes) | 16 + N * 8 bytes | |
|---|---|---|
| type (4 bytes) | "stts" | |
| flags (4 bytes) | 0 | |
| NumberOfEntry (4 bytes) | N | |
| Time-To-Sample table[0] (4 bytes * 2) | frame count | sample count |

TABLE 2-continued

| | | |
|---|---|---|
| Time-To-Sample table[1] (4 bytes * 2) | frame count | sample count |
| . | . | . |
| . | . | . |
| . | . | . |
| Time-To-Sample table[N – 1] (4 bytes * 2) | frame count | sample count |

According to Table 2, the size information size is "16+N*8 bytes", and the entry count information NumberOfEntry is "N". In addition, the entry count information NumberOfEntry is followed by N pieces of tables Time-To-Sample table [0] to Time-To-Sample table [N−1].

For example, assuming that N is "3", and the time scale is "30000", in a case that the frame rate is "30 fps" at first 25 frames, the frame rate is "15 fps" at next 5 frames, and the frame rate is "16.7 fps" at the last 30 frames, the table Time-To-Sample table[0] to the Time-To-Sample table[2] are described as shown in Table 3.

TABLE 3

| | | |
|---|---|---|
| Time-To-Sample table[0] (4 byte * 2) | 25 | 1000 |
| Time-To-Sample table[1] (4 byte * 2) | 5 | 2000 |
| Time-To-Sample table[2] (4 byte * 2) | 30 | 1800 |

When reproducing a moving image file having such data structure, the CPU 26 executes processing according to flowcharts as shown in FIG. 7-FIG. 11. Additionally, the control program according to the flowchart is stored in the flash memory 30.

First, in a step S1, a moving image file selection processing is executed. Thus, a desired moving image file is selected from among a plurality of moving image files recorded in the recording medium 36. In a step S3, an stts table is detected from the selected moving image file. The detected stts table is written to the SDRAM 16 through the I/F 32 and the memory control circuit 14.

In a step S5, a variable K is set to "0". In a step S7, 8 bytes of data starting from the 17+K*8 byte-th of the detected stts table is read, and the read data is described in the TS table 16ts formed in the SDRAM 16. The 8 data read from the stts table includes the frame count and the sample count. Additionally, the TS table 16ts has a structure shown in FIG. 3. The read frame count and sample count are assigned to the index number Ts[K] of the TS table 16.

In a step S9, it is determined whether or not the variable K is equal to "N−1". If "NO" here, the variable K is incremented in a step S11, and then, the process returns to the step S7. The processing in the steps S7-S11 is repeated at number of times corresponding to the number of tables Time-To-Sample table. Accordingly, if the table Time-To-Sample table has information shown in Table 3, the frame count "25", "5" and "30" are respectively assigned to index numbers Ts[0], Ts[1] and Ts[2], and the sample count, "1000", "2000" and "1800" are respectively assigned to the index numbers Ts[0], Ts[1] and Ts[2].

Figure 9:
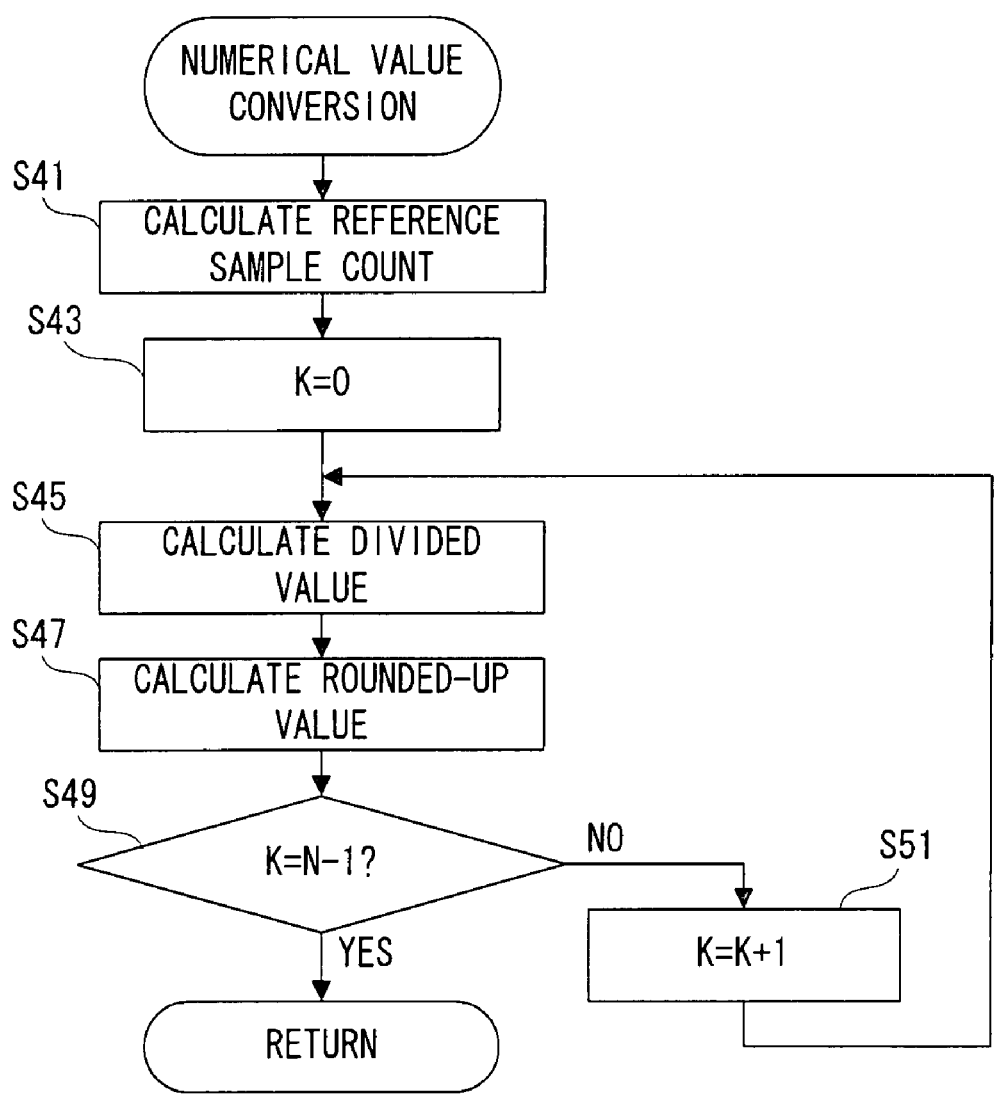
FIG. 9 is flowchart showing the other part of the operation of the CPU applied to FIG. 1 embodiment.

If "YES" is determined in the step S9, the process proceeds to a step S13 to execute numerical value converting processing according to a subroutine shown in FIG. 9.

Referring to FIG. 9, in a step S41, the reference sample count is calculated. More specifically, a time scale described in the header mdhd is detected, and the detected time scale is divided by "39 fps" of a frame rate in reproducing. In a step S43, the variable K is set to "0", and in a succeeding step S45, the sample count assigned to the index number Ts[K] of the TS table 16ts is divided by the reference sample count. The obtained divided value is assigned to the index number Ts[K]. In a step S47, a numerical value to be acquired by rounding up the divided value is obtained. The obtained rounded-up value is also assigned to the index number Ts[K]. In a step S49, it is determined whether or not the variable K reaches "N−1". If "NO", the variable K is incremented in a step S51, and then, the process is returned to the step S45, and if "YES", the process is restored to the hierarchical upper level of the routine.

If the time scale is "30000", the reference sample count is "1000". Consequently, the divided values assigned to the index numbers Ts[0], Ts[2] and Ts[3] respectively indicates "1", "2" and "1.8", and the rounded-up values assigned to the index numbers Ts[0], Ts[2] and Ts[3] respectively indicates "1", "2" and "2".

Here, the divided value is equal to a numerical value obtained by dividing the frame rate of the corresponding compressed image data by the reference frame rate. Accordingly, by consulting the divided values described in the TS table 16ts, it is understood that the compressed image data corresponding to the index number Ts[0] has the reference frame rate (=30 fps), the compressed image data corresponding to the index number Ts[1] is half the reference frame rate, and the compressed image data corresponding to the index number Ts[2] is 1/1.8 of the reference frame rate. In addition, it also can be understood that the frame rate of the compressed image data corresponding to the divided value which is not an integer is different from 1/integer of the reference frame rate.

Returning to FIG. 7, in a step S15, referring to the TS table 16ts, a recorded frame count Xmax is calculated. The recorded frame count Xmax indicates a total value (=25+5+30) of the frame counts described in the TS table 16ts.

In a step S17, reproduced frame counts Ymax1 and Ymax2 are calculated. The reproduced frame count Ymax1 indicates a sum of the values obtained by multiplying the divided values assigned to the index number Ts[K] by the frame counts, respectively. Furthermore, the reproduced frame count Ymax2 indicates a sum of the values obtained by multiplying the rounded-up values assigned to the index number Ts[K] by the frame counts, respectively. In FIG. 3 example, the reproduced frame counts Ymax1 and Ymax2 are "89 (=25×1+5×2+30×1.8)" and "95 (=25×1+5×2+30×2)", respectively.

In a step S19, the reproduced frame count Ymax1 is subtracted from the reproduced frame count Ymax2 to calculate an error frame count M. In FIG. 3 example, the error frame count M is "−6". The calculated error frame count M is written to a register 16r (see FIG. 4) formed in the SDRAM 16.

According to FIG. 3, the divided value and the rounded-up value assigned to the index number Ts[1] are different from each other, but the divided value and the rounded-up value assigned to each of the index numbers Ts[0] and the Ts[2] are coincident with each other. That is, with respect to the compressed image data having a frame rate different from one/integer of the reference frame rate, that is, an improper frame rate, a difference occurs between the divided value and the rounded-up value.

Accordingly, the error frame count M is equal to the difference between the values "54" and "60" obtained by multiplying the frame count of the compressed image data having the improper frame rate by each of the divided value and the rounded-up value.

It should be noted that the multiplied value (=54) and the divided value (=60) obtained with respect to the compressed image data having the improper frame rate respectively represent the frame count required to reproduce the compressed image data having improper frame rate in real time and the frame count obtained by performing periodic frame interpolation processing on the compressed image data having the improper frame rate.

In a step S21, a frame table 16ta is created. More specifically, with reference to the stsc table, the stsz table, and the sico table shown in FIG. 2, a start address ad[x] and a size sz[x] of compressed image data of each frame is detected, and the detected start address ad[x] and size sz[x] are assigned to the index number Ta[x] of the frame table 16ta shown in FIG. 5. It should be noted that the variable x is the recorded frame number. According to FIG. 3, the recorded frame count is "60", and therefore, the start addresses ad[1] to ad[60] are respectively assigned to the index numbers Ta[0] to Ta[59], and the sizes sz[1] to sz[60] are respectively assigned to the index numbers Ta[0] to Ta[59].

In a step S23, the frame table 16tb shown in FIG. 6 is created on the basis of the TS table 16ts, the register 16r, and the frame table 16ta. The detailed processing operation will be explained later.

After completion of the table converting processing, it is determined whether or not a reproduction starting operation is performed in a step S25. If "YES" here, a variable y defining the index number Tb[y] of the frame table 16tb is set to "0" in a step S27. When a vertical synchronization signal Vsync is generated, the process proceeds from a step S29 to a step S31 to determine the description assigned to the index number Tb[y] of the frame table 16tb. If "frame skip" is described, the process directly proceeds to a step S35. If the start address and the size are described, the process proceeds to the step S35 through one frame reproduction processing in a step S33. In the step S35, it is determined whether or not the variable y is equal to "Ymax2−1", and if "NO", the variable y is incremented in a step S37, and then, the process returns to the step S29. If "YES" is determined in the step S35, the process returns to the step S1.

In the step S33, the JPEG decoding circuit 12 is instructed to perform decoding processing of one frame of compressed image data defined by notable address and size. The JPEG decoding circuit 12 reads the desired compressed image data from the compressed image area of the SDRAM 16, decodes the read compressed image data, and writes the decoded image data to the decoded image area of the SDRAM 16.

A vertical synchronization signal Vsync is generated from a timing generator not shown per 1/30 seconds. The video encoder 18 reads one frame of image data from the decoded image area in response to the vertical synchronization signal Vsync, and applies a composite video signal on the basis of the read image data to the LCD monitor 20.

Accordingly, if the determination result in the step S31 is "NO", the image displayed on the LCD monitor 20 is updated every time that a vertical synchronization signal Vsync is generated. Thus, a moving image is output to the LCD monitor 20. If the determination result in the step S31 is "YES", the same image is successively displayed on the LCD monitor 20. The movement of the image output from the LCD monitor 20 is temporarily stopped.

Figure 10:
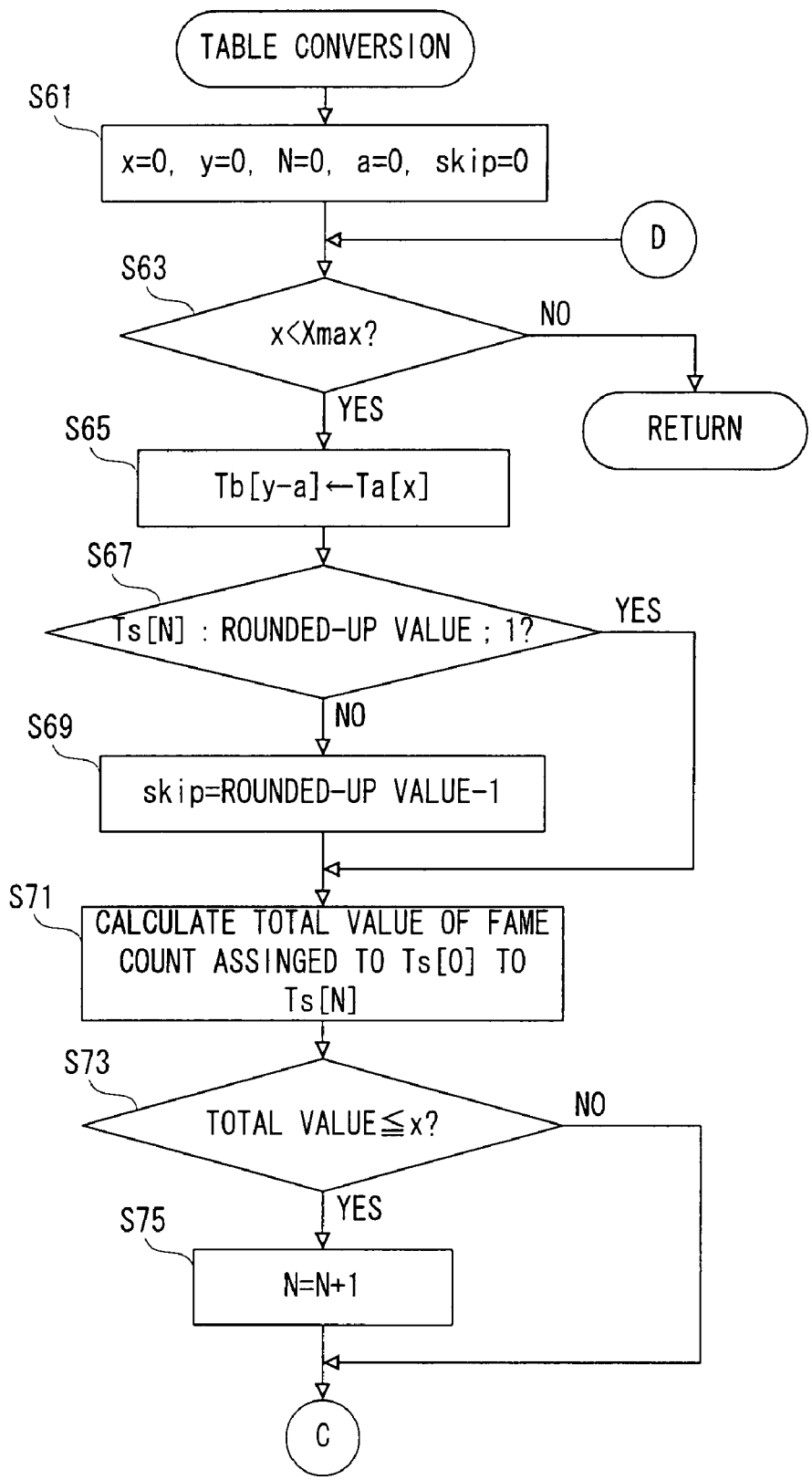
FIG. 10 is a flowchart showing a further part of the operation of the CPU applied to FIG. 1 embodiment.
Figure 11:
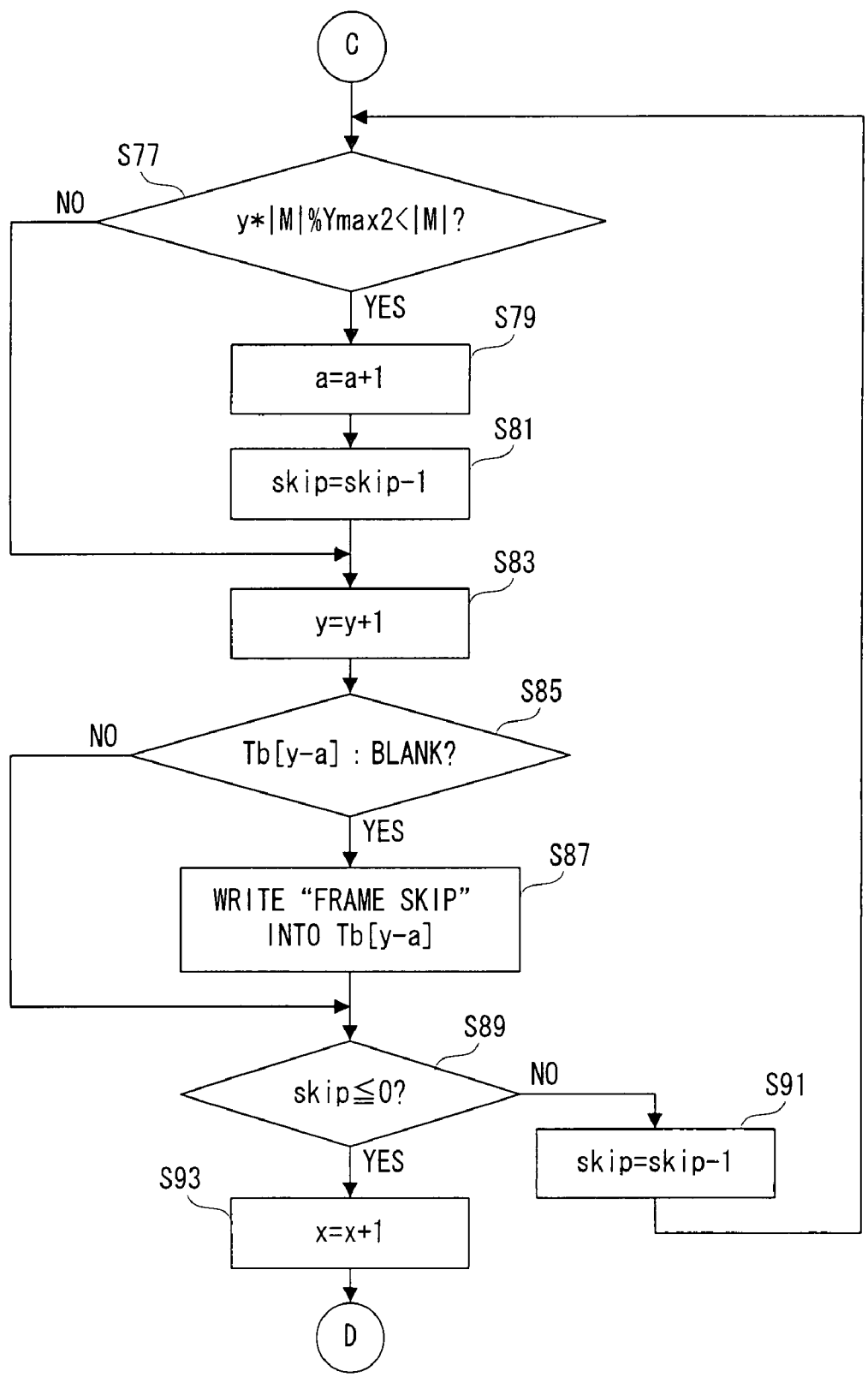
FIG. 11 is a flowchart showing another part of the operation of the CPU applied to FIG. 1 embodiment.

The table converting processing in the step S23 complies with a subroutine shown in FIG. 10-FIG. 11. First, in a step S61, each of the variables x, y, N, a and skip is set to "0". In a step S63, it is determined whether or not the variable x is below the recorded frame count Xmax. If "YES" here, the process proceeds to the process in a step S65 and onward, and if "NO", the process is restored to the hierarchical upper level of the routine.

In the step S65, a start address ad[x+1] and a size sz[x+1] assigned to the index number Ta[x] of the frame table 16ta are set to the index number Tb[y−a] of the frame table 16tb. In a step S67, it is determined whether or not the rounded-up value assigned to the index number Ts[N] of the TS table 16ts is "1". If "YES" here, the process directly proceeds to a step S71, and if "NO", "rounded-up value −1" is set to the variable skip in a step S69, and then, the process proceeds to the step S71.

In the step S71, the total value of the frame counts respectively assigned to the index numbers Ts[0] to Ts[N] is calculated, and in a step S73, it is determined whether or not the calculated total value is below the variable x. If "NO" here, the process directly proceeds to a step S77, but if "YES", the variable N is incremented in a step S75, and then, the process proceeds to the step S77. In the step S77, it is determined whether or not Condition 1 is satisfied.

$$y*|M|\%Ymax2<|M|$$ [Condition 1]

According to the condition 1, the variable y is multiplied by an absolute value of the error frame count M, and the multiplied value thus obtained is divided by the reproduced frame count Ymax2. Then, the remainder obtained by the division is compared with an absolute of the error frame count M. Thus, the number of determinations as "YES" in the step S77 corresponds to the error frame count M. The determination result as "YES" is obtained at an approximately uniform cycle.

When "NO" in the step S77, the process directly proceeds to a step S83. On the other hand, when "YES" is determined in the step S77, the variable a is incremented in a step S79, the variable skip is decremented in a step S81, and then, the process proceeds to the step S83.

In the step S83, the variable y is incremented, and in a step S85, it is determined whether or not a column of the index number Tb[y−a] is blank. If "NO" here, the process directly proceeds to a step S89, but if "YES", "frame skip" is written to the column of the index number Tb[y−a] in a step S87, and then, the process proceeds to the step S89. It should be noted that when the variable a is incremented in the step S79, "NO" is determined in the step S85.

In the step S89, it is determined whether or not the variable skip is equal to or less than "0". If "NO" here, the variable skip is decremented in a step S91, and then, the process returns to the step S77. On the other hand, if "YES", the variable x is incremented in a step S93, and then, the process returns to the step S63.

When the variable skip is equal to or less than "0", "frame skip" set in the step S87 is overwritten with the start address ad[x+1] and the size sz[x+1] assigned to the index number Ta[x] when the process returns to the step S65. The frame thinning-out processing is realized by the overwriting.

If the variable skip is equal to or more than "1", the process returns to the step S83 through the steps S91, S77 to S81, and thus, the variable y is incremented. Consequently, "frame skip" set by the processing in the step S87 at the previous time remains as it is. Thus, the frame interpolation processing is realized.

Additionally, each of the frame thinning-out processing and the frame interpolation processing may also be defined as "screen count adjusting processing".

As understood from the above description, the moving image includes a partial moving image having a frame rate (=16.7 fps) different from a reference frame rate (=30 fps). The video encoder 18 reproduces such a moving image at the reference frame rate. The CPU 26 calculates a difference value (=−6) between a first frame count (=54) required to reproduce the partial moving image in real time and a second frame count (=60) obtained by performing a periodic frame interpolation processing on the partial moving image (S19).

The CPU 26 dispersively executes frame thinning-out processing at the number of times corresponding to the calculated difference value on the moving image (S77, S79, S83, S85, S65). The CPU 26 further executes frame interpolation processing at the number of times corresponding to the second frame count on the partial moving image (S67, S69, S83, S85, S87, S89, S91).

The moving image is reproduced in real time by the frame thinning-out processing and the frame interpolation processing. That is, an error of the temporal axis is compensated. Furthermore, the frame interpolation processing allows a smooth movement of the partial moving image.

Additionally, in this embodiment, when the divided value is rounded, the fractional part is rounded up, but may be rounded down in place of rounding up of it. In this case, the screen count adjusting processing executed over a moving image becomes the frame interpolation processing.

Furthermore, in this embodiment, reproduction of the moving image varying at a range below the reference frame rate is assumed. However, the present invention can also be applied to an apparatus reproducing a moving image varying at a rate above the reference frame rate. In this case, the screen count adjusting processing executed on a partial moving image is frame thinning-out processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving image reproducing apparatus, comprising:
   a reproducer configured to reproduce a moving image including a partial moving image having a screen rate different from a reference screen rate at said reference screen rate;
   a calculator configured to calculate a difference value between a first number indicative of the number of screens required to reproduce said partial moving image in real time and a second number indicative of the number of screens obtained by performing periodic screen count adjusting processing on said partial moving image;
   a first adjuster configured to dispersively execute the screen count adjusting processing on said moving image at the number of times corresponding to the difference value calculated by said calculating means; and
   a second adjuster configured to execute the screen count adjusting processing on said partial moving image at the number of times corresponding to said second number.

2. A moving image reproducing apparatus according to claim 1, wherein a screen rate of said partial moving image is lower than said reference screen rate, and the screen count adjusting processing to be executed by said second adjuster is processing for interpolating a screen.

3. A moving image reproducing apparatus according to claim 2, wherein the screen rate of said partial moving image is different from 1/integer of said reference screen rate.

4. A moving image reproducing apparatus according to claim 2, wherein said first number is larger than said second number, and the screen count adjusting processing to be executed by said first adjuster is processing for thinning-out of the screen.

5. A moving image reproducing apparatus according to claim 1, wherein said first adjuster includes a determiner configured to determine a timing to execute said screen count adjusting processing on the basis of the number of screens to be reproduced by said reproducer and the difference value calculated by said calculator.

6. A moving image reproducing apparatus according to claim 1, wherein said calculator includes a divider configured to divide a parameter value in relation to the screen rate of said partial moving image by a parameter value in relation to said reference screen rate, a numerical value converter which rounds the divided value obtained by said divider, and a difference calculator configured to calculate said difference value on the basis of the divided value obtained by said dividing means and the converted value obtained by said numerical value converter.

7. A method for moving image reproducing, comprising the steps of:
   reproducing a moving image including a partial moving image having a screen rate different from a reference screen rate at said reference screen rate;
   calculating a difference value between a first number indicative of the number of screens required to reproduce said partial moving image in real time and a second number indicative of the number of screens obtained by performing periodic screen count adjusting processing on said partial moving image;
   dispersively executing the screen count adjusting processing on said moving image at the number of times corresponding to the difference value calculated by said calculating step; and
   executing the screen count adjusting processing on said partial moving image at the number of times corresponding to said second number.

8. A non-transitory computer readable storage medium storing a moving image reproducing program to be executed by a processor of a moving image reproducing apparatus, said program making the processor execute:
   reproducing a moving image including a partial moving image having a screen rate different from a reference screen rate at said reference screen rate;
   calculating a difference value between a first number indicative of the number of screens required to reproduce said partial moving image in real time and a second number indicative of the number of screens obtained by performing periodic screen count adjusting processing on said partial moving image;
   dispersively-executing the screen count adjusting processing on said moving image at the number of times corresponding to the calculated difference value;
   executing the screen count adjusting processing on said partial moving image at the number of times corresponding to said second number; and
   reproducing the partial moving image.

* * * * *